US011023094B2

(12) United States Patent
Dacosta et al.

(10) Patent No.: US 11,023,094 B2
(45) Date of Patent: *Jun. 1, 2021

(54) COLLABORATIVE, MULTI-USER SYSTEM FOR VIEWING, RENDERING, AND EDITING 3D ASSETS

(71) Applicant: Autodesk, Inc., San Rafael, CA (US)

(72) Inventors: Thiago Dacosta, Montreal (CA); Arno Zinke, Bonn (DE); Dov Amihod, Montreal (CA)

(73) Assignee: AUTODESK, INC., San Rafael, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/425,649

(22) Filed: May 29, 2019

(65) Prior Publication Data

US 2019/0278459 A1 Sep. 12, 2019

Related U.S. Application Data

(63) Continuation of application No. 14/181,376, filed on Feb. 14, 2014, now Pat. No. 10,345,989.

(60) Provisional application No. 61/771,473, filed on Mar. 1, 2013, provisional application No. 61/764,871, filed on Feb. 14, 2013.

(51) Int. Cl.
*G06F 3/0481* (2013.01)
*G06Q 10/10* (2012.01)
*G06F 111/02* (2020.01)

(52) U.S. Cl.
CPC ....... *G06F 3/04815* (2013.01); *G06Q 10/101* (2013.01); *G06F 2111/02* (2020.01); *G06T 2200/16* (2013.01)

(58) Field of Classification Search
CPC ............ G06F 2217/04; G06F 3/04815; G06F 2111/02; G06T 2200/16; G06T 2219/024; G06Q 10/10; G06Q 10/101
See application file for complete search history.

(56) References Cited

U.S. PATENT DOCUMENTS

| | | |
|---|---|---|
| 6,219,057 B1 | 4/2001 | Carey et al. |
| 7,076,735 B2 | 7/2006 | Callegari |
| 8,732,247 B2 | 5/2014 | Dittmer-Roche |
| 2002/0183878 A1 | 12/2002 | Chartier et al. |
| 2005/0278642 A1 | 12/2005 | Chang et al. |
| 2006/0129634 A1 | 6/2006 | Khouzam et al. |
| 2007/0011273 A1* | 1/2007 | Greenstein .............. G06T 19/00 709/217 |

(Continued)

OTHER PUBLICATIONS

Dana, K. J., et al., "Reflectance and Texture of Real-World Surfaces", ACM Transactions on Graphics 18 (January), pp. 1-34, 1999.

(Continued)

*Primary Examiner* — Liang Y Li
(74) *Attorney, Agent, or Firm* — Gates & Cooper LLP

(57) ABSTRACT

Systems and methods are presented for allowing multiple users to collaboratively edit 3-D assets in real-time, using a distributed 3-D editing/rendering software application. The software application may include a lightweight, browser-based user interface that is able to run on computing devices with relatively little memory and processing power. The software application may further include a progressive rendering engine.

8 Claims, 10 Drawing Sheets

(56) References Cited

U.S. PATENT DOCUMENTS

| | | |
|---|---|---|
| 2007/0211055 A1 | 9/2007 | Stein et al. |
| 2010/0325176 A1 | 12/2010 | Karlsson |
| 2011/0169826 A1 | 7/2011 | Elsberg et al. |
| 2012/0233555 A1 | 9/2012 | Psistakis |
| 2012/0256914 A1* | 10/2012 | Chevochot .............. G06F 30/13 345/419 |
| 2013/0038618 A1* | 2/2013 | Urbach ................... G06T 15/06 345/522 |
| 2013/0120367 A1 | 5/2013 | Miller et al. |
| 2013/0120368 A1* | 5/2013 | Miller .................... G06T 19/00 345/419 |
| 2013/0144566 A1 | 6/2013 | De Biswas |
| 2014/0237373 A1 | 8/2014 | Kennedy et al. |
| 2014/0278269 A1 | 9/2014 | Winn et al. |
| 2016/0171743 A1 | 6/2016 | Urbach |

OTHER PUBLICATIONS

Ma, Haoxue, and Tore Risch. "A database approach for information communication in a peer-to-peer collaborative CAD environment." Software: Practice and Experience 37.11 (2007): 1193-1213.
Canadian Office Action dated Nov. 18, 2020 for Canadian Patent Application No. 2,842,975.

* cited by examiner ns to additional end-user client devices over a network; and displaying said modifications using graphical user interfaces running on said additional end-user client devices; wherein the steps of modifying, distributing and displaying occur in real-time, allowing the first end-user client device and the additional end-user client devices to display a substantially synchronized view of the 3-D project. In some embodiments, the described methods further include: communicating the modifications to one or more rendering clients; generating, using the rendering clients, rendered images representing 3-D scenes relating to the 3-D project; distributing said rendered images to one or more end-user client devices; and displaying said rendered images on said one or more end-user client devices.

COLLABORATIVE, MULTI-USER SYSTEM FOR VIEWING, RENDERING, AND EDITING 3D ASSETS

CROSS-REFERENCE TO RELATED APPLICATIONS

This application is a continuation under 35 U.S.C. § 120 of Application Ser. No. 14/181,376, filed on Feb. 14, 2014, which issued Jul. 9, 2019 as U.S. Pat. No. 10,345,989 with inventor(s) Thiago Da Costa, Arno Zinke, and Dov Amihod, entitled "Collaborative, Multi-User System for Viewing, Rendering, and Editing 3D Assets," which application is incorporated by reference and herein, and which application claims priority under 35 U.S.C. § 119(e) to U.S. Provisional Application 61/764,871, filed Feb. 14, 2013, entitled Distributed, Multi-User System for Collaborative Editing of 3-D Projects, and U.S. Provisional Application 61/771,473, filed Mar. 1, 2013, entitled Collaborative, Multi-User System for Managing and Storing 3D Assets, both of which are incorporated herein by reference in their entirety.

INCORPORATION BY REFERENCE

All patents, patent applications and publications cited in this document are incorporated herein by reference in their entirety.

BACKGROUND

Field of the Disclosure

The present disclosure generally relates to methods and systems for rendering 3-D graphics, and more specifically to systems for editing 3-D projects collaboratively over a computer network.

Description of Related Art

Creating high-quality 3-D graphics is often a collaborative process that requires the creative input and expertise of many different people. Existing 3-D editing systems, however, are not designed for collaboration. They are typically standalone applications that run only on high-performance workstations. Using these systems for collaborative projects requires providing, to each member of the team, the necessary software and a workstation capable of running it. For large teams, this is often prohibitively expensive.

Further, existing systems usually store 3-D project information locally in large data files. Whenever one team member changes the project, the even if the change is a minor one, the updated project file must be distributed to every other team member using, e.g., FTP or email. Distributing project data in this way is slow and prone to errors. Also, using this method, only one team member can edit the project at any given time; simultaneous editing will create multiple, inconsistent project files.

SUMMARY

Herein are described methods for allowing multiple users to collaboratively edit 3-D projects in real-time using multiple end-user client devices distributed over a network, these methods including: modifying a 3-D project using a graphical user interface running on a first end-user client device by creating or changing 3-D assets belonging to the 3-D project; distributing information representing the modifications to additional end-user client devices over a network; and displaying said modifications using graphical user interfaces running on said additional end-user client devices; wherein the steps of modifying, distributing and displaying occur in real-time, allowing the first end-user client device and the additional end-user client devices to display a substantially synchronized view of the 3-D project. In some embodiments, the described methods further include: communicating the modifications to one or more rendering clients; generating, using the rendering clients, rendered images representing 3-D scenes relating to the 3-D project; distributing said rendered images to one or more end-user client devices; and displaying said rendered images on said one or more end-user client devices.

This application also describes systems that allow multiple users to collaboratively edit 3-D projects in real-time using multiple end-user client devices distributed over a network, these systems including: a first end-user client device operable to provide a graphical user interface that permits a user to modify a 3-D project by creating or changing 3-D assets belonging to the 3-D project; one or more additional end-user client devices, each additional end-user client device operable to receive said modifications and to display said modifications using a graphical user interface; wherein the additional end-user client devices receive and display the modifications to the 3-D project in real-time, allowing the first end-user client device and the additional end-user client devices to display a substantially synchronized view of the 3-D project as it is modified. In some embodiments, the described systems further include one or more rendering clients operable to receive said modifications and to generate rendered images representing 3-D scenes relating to the 3-D project; wherein said rendered images are received and displayed by one or more of the end-user client devices.

Some of the systems and methods described herein provide a lightweight, browser-based user interface that is able to run on computing devices with relatively little memory and processing power, including portable computers and mobile devices. To provide a responsive and satisfying user experience, some of the described systems and methods implement various features including automatic thumbnail generation, progressive rendering, biased and unbiased rendering modes, transparent resource allocation, geometry encoding and compression, and biased interleaving.

To improve the speed and/or quality of 3-D rendering, some of the systems and methods described herein employ various rendering techniques such as combined unbiased/biased rendering, firefly reduction, non-local image reconstruction, acceleration data structures, and synthesized bidirectional texture functions. Some of the described systems and methods further include components for computing physical simulations, animations, and modeling/tessellation.

BRIEF DESCRIPTION OF THE DRAWINGS

The disclosure herein is described with reference to the following figures, which are presented for the purpose of illustration only and are not intended to be limiting.

DETAILED DESCRIPTION

Figure 1:
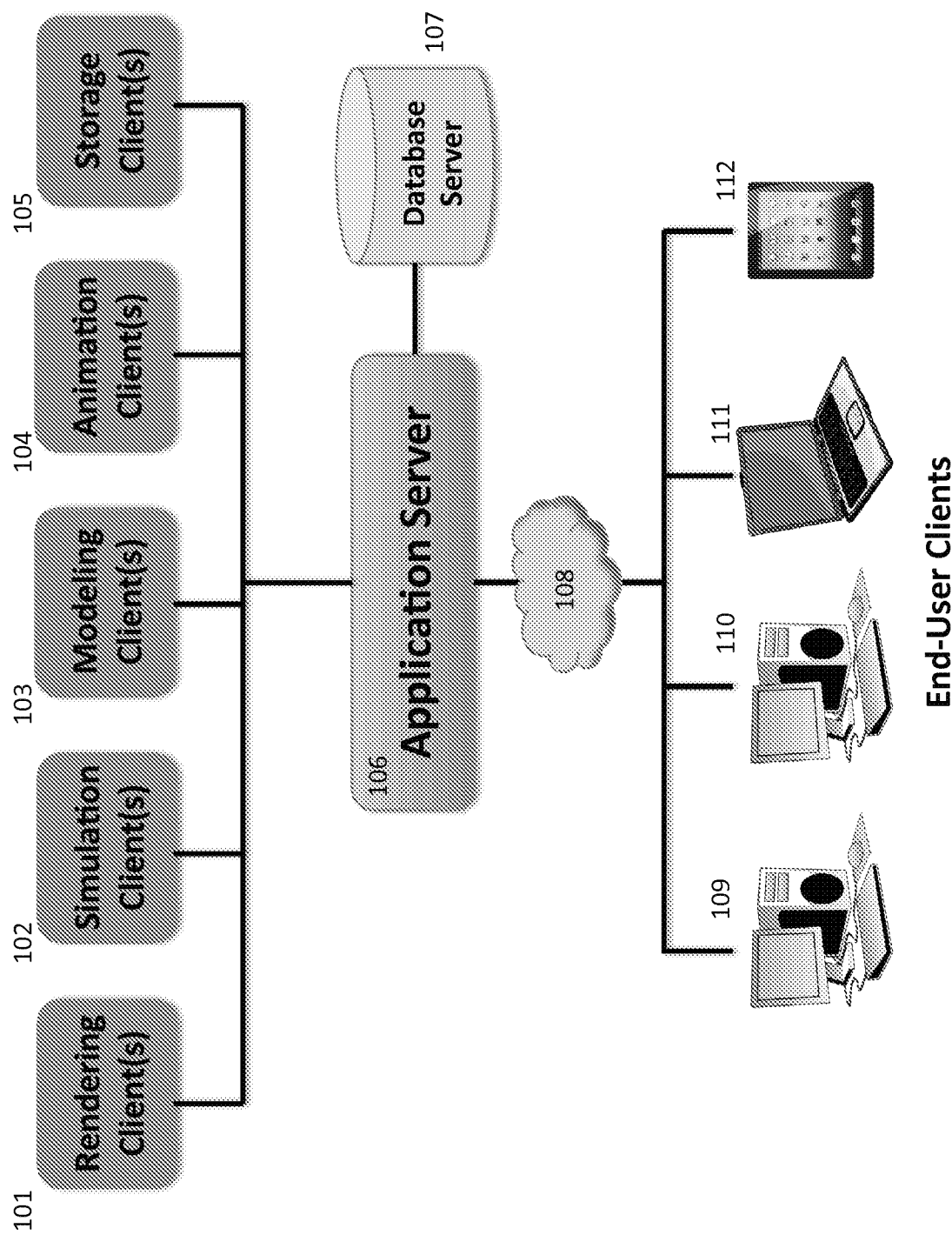
FIG. 1 is a block diagram that illustrates the architecture of a distributed 3D editing system according to some embodiments.

FIG. 1 shows the architecture of a distributed 3-D editing system according to a preferred embodiment. The components of the system may be interconnected via any type of computer network, including local-area networks, wide-area networks (such as the internet 108), or any combination of the two. The process of creating and viewing a 3-D project is collectively performed by multiple clients that serve various purposes. Multiple people may simultaneously view and edit a 3-D project using end-user clients 109, 110, 111, and 112. Other types of clients participate in the creation/editing of a 3-D project, including rendering clients 101, simulation clients 102, modeling clients 103, animation clients 104, and storage clients 105. Each of these clients is connected to an application server 106, which manages communication among clients and allocates system resources. The application server is also connected to a database server 107 for storing and retrieving project data.

End-User Interface

End-user clients provide a user interface for viewing, editing, and rendering a 3-D project. A project includes various types of assets (e.g., 3-D models, 3-D scenes, images, animations, simulations, etc.) that may be created and edited simultaneously by multiple members of the project team.

In some embodiments, the user interface runs inside a web browser and is implemented using standards and libraries that are widely available (e.g., HTML5, JavaScript, WebGL). The end-user client software is designed to be as lightweight as possible. Processing- and memory-intensive tasks (e.g., modeling, simulation, animation, and unbiased rendering) are performed by other components of the distributed system. Thus, the end-user client software may run on almost any computing device with a graphical display, including desktop computers and workstations, laptops, and mobile devices such as tablets and smartphones.

Figure 2:
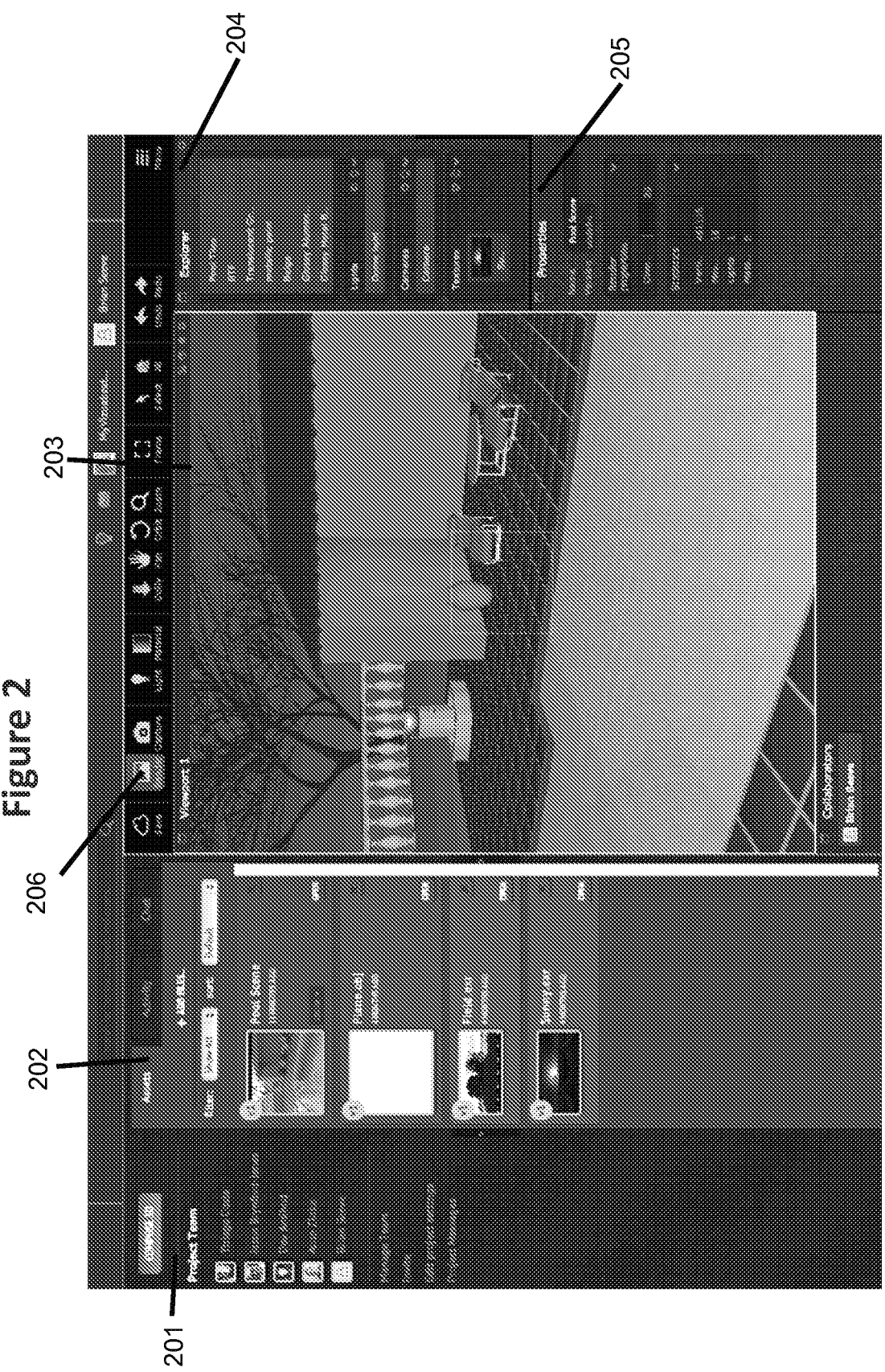
FIG. 2 is a screenshot of the end-user editing interface according to some embodiments.

FIG. 2 shows a screenshot of the end-user interface, according to some embodiments. The interface is divided into various panes: the "Project Team" pane 201 allows the user to communicate with members of the team and manage project/team settings. The "Assets" pane 202 allows the user to select/add project assets. The "Viewport" pane 203 displays a 3-D representation of the asset currently being edited. The "Explorer" pane 204 allows a user to view the various objects belonging to the current asset, and the "Properties" pane 205 displays the properties of the selected object.

The "Render" button 206 shown in FIG. 2 allows the user to toggle Rendering Mode. When Rendering Mode is turned off, the Viewport pane displays the current asset using biased rendering techniques. Biased rendering produces less realistic images than unbiased rendering, but it is much faster, allowing the user to move and modify objects and change the camera angle without perceptible delay. Biased rendering is performed locally on the end-user client device using, e.g., WebGL.

When Rendering Mode is on, the Viewport pane 203 displays the current asset using unbiased rendering techniques (described in detail below), providing a much more realistic image. This unbiased rendering is performed by a rendering client, and the resulting rendered image is transmitted over the network to the end-user client, where it is displayed on the screen.

Unbiased rendering is computationally intensive and can take a long time to complete. However, the system uses progressive rendering to provide incremental updates to the user throughout the rendering process. Thus, almost immediately after rendering begins, the Viewport is able to display a partially rendered image. As updates are received by the end-user client during rendering, the quality of the displayed image progressively improves.

Biased Interleaving

When Rendering Mode is on, "biased interleaving" is used to allow editing at interactive frame rates. For example, when the user moves an object in a 3-D scene, the end-user interface provides real-time interaction with the object being moved. One technique for implementing biased interleaving is as follows:

1. Given a client interacting with a 3-D scene, a interaction frequency is computed based on how many interactions are needed per time-step. Example: a fast moving object across the screen will have a high interaction frequency.
2. The end-user client application switches into rasterization drawing mode, which provides real-time interaction with the moving object. In rasterization drawing mode, a biased rendering of the moving object is generated by the end-user client and overlaid on the rendered image.
3. The rendering client that is providing the renders may turn off certain computations such as, e.g., multiple light bounces, light scattering events, etc., that are computationally intensive. The Render client may also start using Direct Illumination (i.e., it will only sample the light sources). Additionally, the Render Client may reduce the image output size and use a lower sampling rate.
4. When the interaction frequency lowers to zero, this signifies that the interaction is complete, so the end-user client turns off rasterization mode and returns to high-fidelity rendering mode. The render client will have finished computing any computationally intensive tasks (e.g., acceleration data structures) and will be ready to produce high-fidelity images based on the updated, post-interaction scene.
5. The rendering client turns on any computationally intensive features it had disabled earlier (e.g., advanced light functions such as multiple-bounces or light scattering events) and the adaptive refinement continues taking place.

Figure 3:
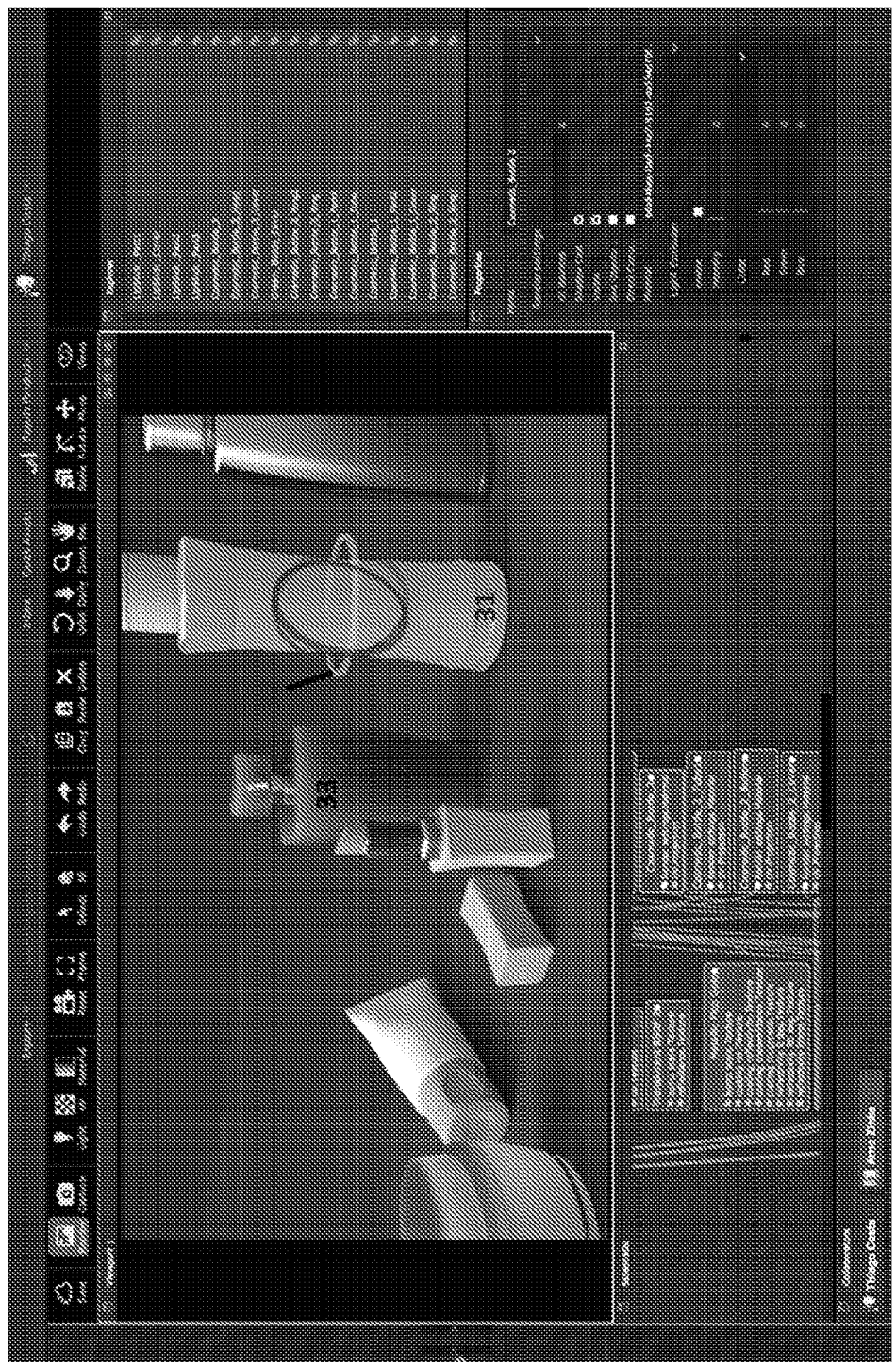
FIG. 3 is a screenshot of the end-user editing interface showing a biased overlay with an arcball-style interaction interface, according to some embodiments.

FIG. 3 shows a biased overlay 31 superimposed on a 3D object that has been selected by the user. Using interface controls (e.g., buttons and menu items), a mouse, a keyboard, and other input devices, the user may modify various properties of the 3D object (e.g., its position, size, orientation, color, texture, etc.) and the biased overlay will be updated accordingly, in real-time. Other objects in the scene, such as perfume bottle 33, are rendered using unbiased techniques as described above. In addition to the biased overlay itself, various interaction/informational interfaces may be displayed to aid the user when in rasterization drawing mode. For example, the system may employ an arcball-style interaction interface 32 that allows the user to adjust an object's position or orientation.

Figure 4:
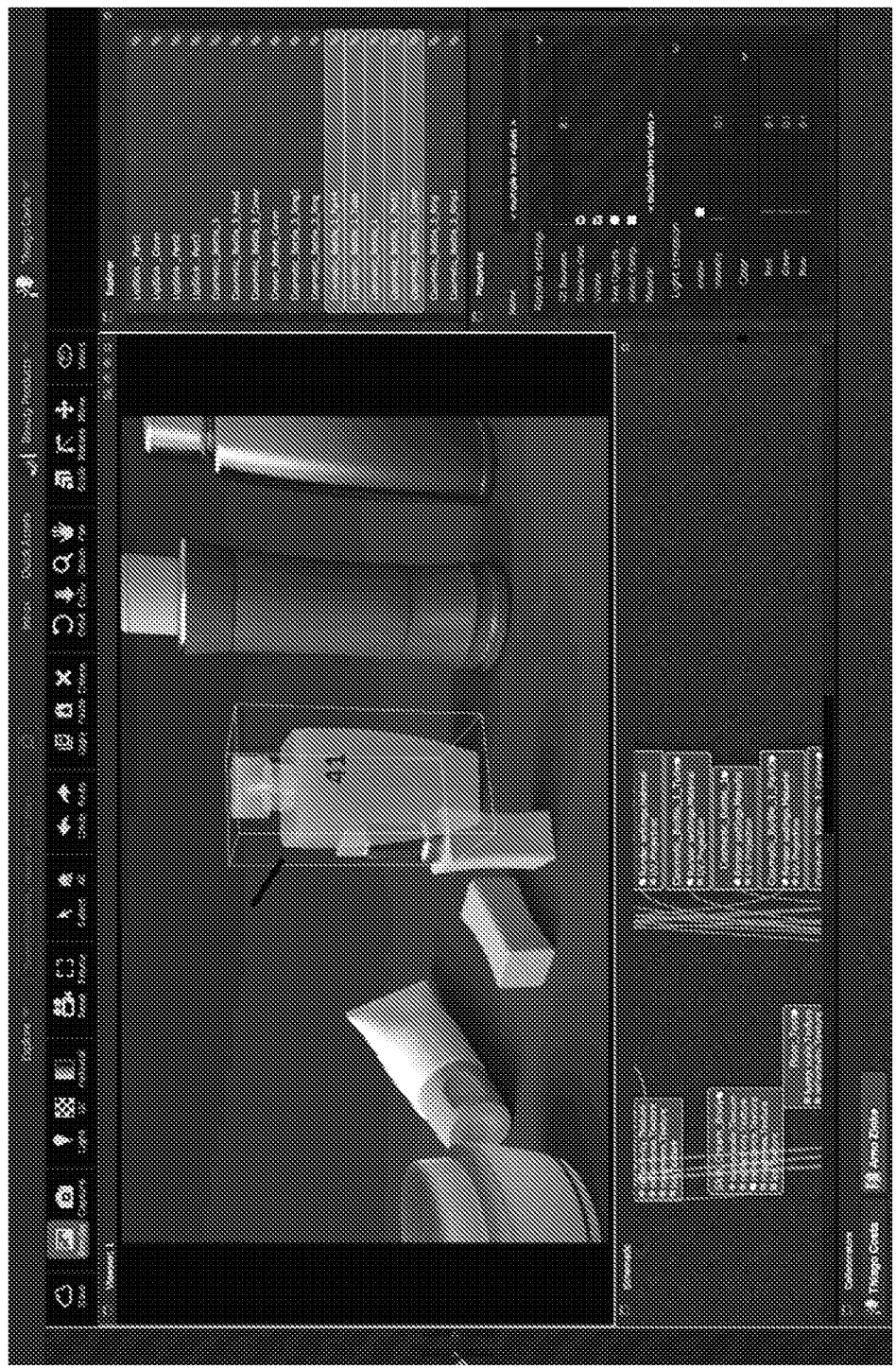
FIG. 4 is a screenshot of the end-user editing interface showing a biased overlay with a bounding-box-style interaction interface, according to some embodiments.

As explained above, the biased overlay follows the user's selection; when the user selects a different 3D object in the scene, a biased overlay is superimposed over the newly selected object. For example, if the user selects perfume bottle 33, any previous biased overlays will disappear and a new biased overlay will be superimposed over the perfume bottle. FIG. 4 illustrates this scenario, in which biased overlay 41 is superimposed on the selected perfume bottle, which is framed by a bounding-box-style interaction interface 42 that allows a user to modify the size and position of the selected object.

Figure 5:
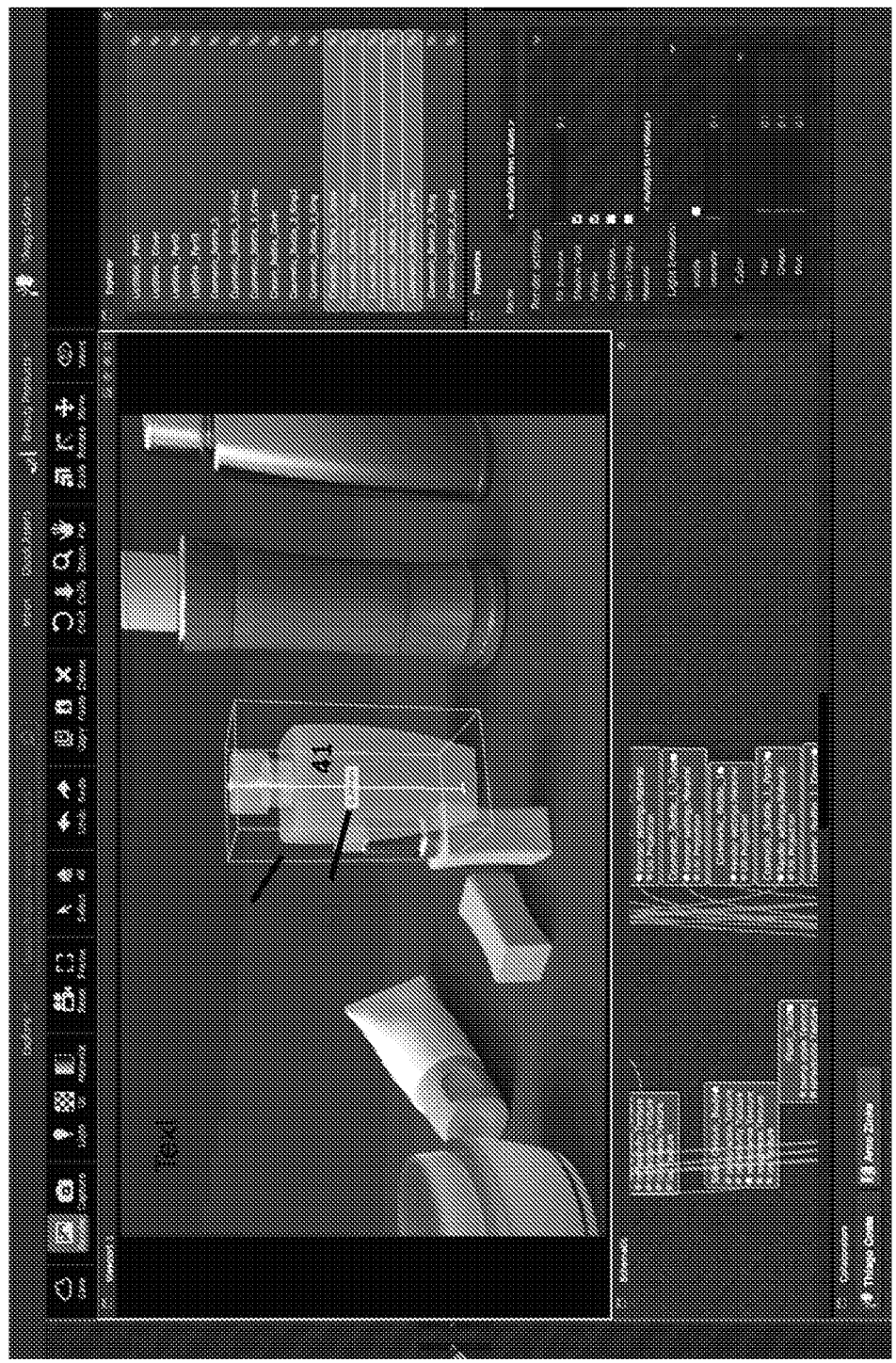
FIG. 5 is a screenshot of the end-user editing interface showing a biased overlay with a bounding-box-style interaction interface and a dimension indicator, according to some embodiments.

Bounding-box-style interface 42 and arcball-style interface 32 are just two examples of the various types of interaction handles and/or user interface elements that may be displayed by the end-user client interface in rasterization drawing mode. Other interaction interfaces (e.g., a "virtual sphere" interface) may also be used. The system may also display interface elements that include information about the selected 3D object, such as its dimensions, orientation, GUID, color, texture, name, etc. For example, FIG. 5 shows a dimension indicator 51 that indicates the height of the selected object in centimeters.

Asset Management and Permissions

The interface allows users to add assets to a project by uploading files that are stored locally on the end-user client machine. The system is able to recognize files in a wide variety of formats including, but not limited to, JPEG, PNG, PLY, STL, 3-DS, OBJ, LWO, OFF, WSL, OpenEXR, and COLLADA Digital Asset Exchange files. After uploading a 3-D asset, the system generates a thumbnail image representing the asset that is shown in the "Assets" pane. The thumbnail generation algorithm is described in more detail below.

In some embodiments, each 3D asset is "owned" by a particular user of the system. The owner of an asset may specify various access permissions for that asset, including:
1. Read Access, allowing other users of the system to view the asset.
2. Download Access, allowing other users of the system to export a file representing the asset to their local machines (using, e.g., one of the file formats listed above).
3. Use Access, allowing other users of the system to incorporate references to the asset into their own projects.
4. Copy Access, allowing other users of the system to create their own copies of the asset for future use/modification in their own projects.
5. Modify Access, allowing other users of the system to modify various properties of the asset, either locally or globally.

Asset permissions may be specified globally for all users of the system, or on a per-user basis. In some embodiments, a user may be a member of one or more groups, and asset permissions may be specified at the group level. The system may allow the owner of an asset to specify any combination of global, group-level, and user-level permissions for that asset. For example, for a given asset, Read Access may be granted to all users of the system, Use Access may be granted only to members of certain groups, and Modify Access may be granted only to a few specifically-designated users.

Permissions may also be specified on a per-project basis. The owner of a project may designate the project on the system as "Private," in which case it will only be accessible by other members of that project, or "Public," in which case any user of the system may access the project. The project owner may change the status of a project from Public to Private, or vice versa, at any time.

Depending on its access permissions, a given asset may be used by multiple users across multiple projects. In some embodiments, assets are added to projects by reference—i.e. a pointer to an asset's content is added to the project, rather than copying the asset's underlying data into each project into which the asset is incorporated.

Depending on a user's permissions, a user may modify an asset globally or locally. Global modifications change the properties of the asset in all projects where that asset appears. Local modifications change the asset only in the context of a particular project; these modifications, or "deltas," are associated with the asset in a local context. In some embodiments, when a locally-modified asset is included in a scene, the system first acquires the global asset representation, then applies any local "deltas" that are associated with the object. Both the underlying asset and all "deltas" associated with that asset are stored efficiently (using, e.g., the geometry compression and move protocol methods described below). This method of global and local asset modifications allows the system to efficiently accommodate multiple variations of a single underlying asset.

As described above, if a user has the proper permissions, a user may choose to incorporate an asset into a project by copying its underlying data, rather than merely adding a reference to the asset. This creates a new, separate asset that appears to be identical to the original asset, but which may have, e.g., a different name or global identifier. The new asset is stored separately from the original asset and may be associated with its own access permissions. Any modifications made to the new asset will not be reflected in the original asset.

Favorite Assets List

A list of "favorite" assets may be maintained on a per-user basis. A user's own assets may be added to the list, and also—depending on access permissions—assets belonging to others. Because it is maintained on a per-user basis, a user's favorite assets list persists across scenes and projects.

Figure 6:
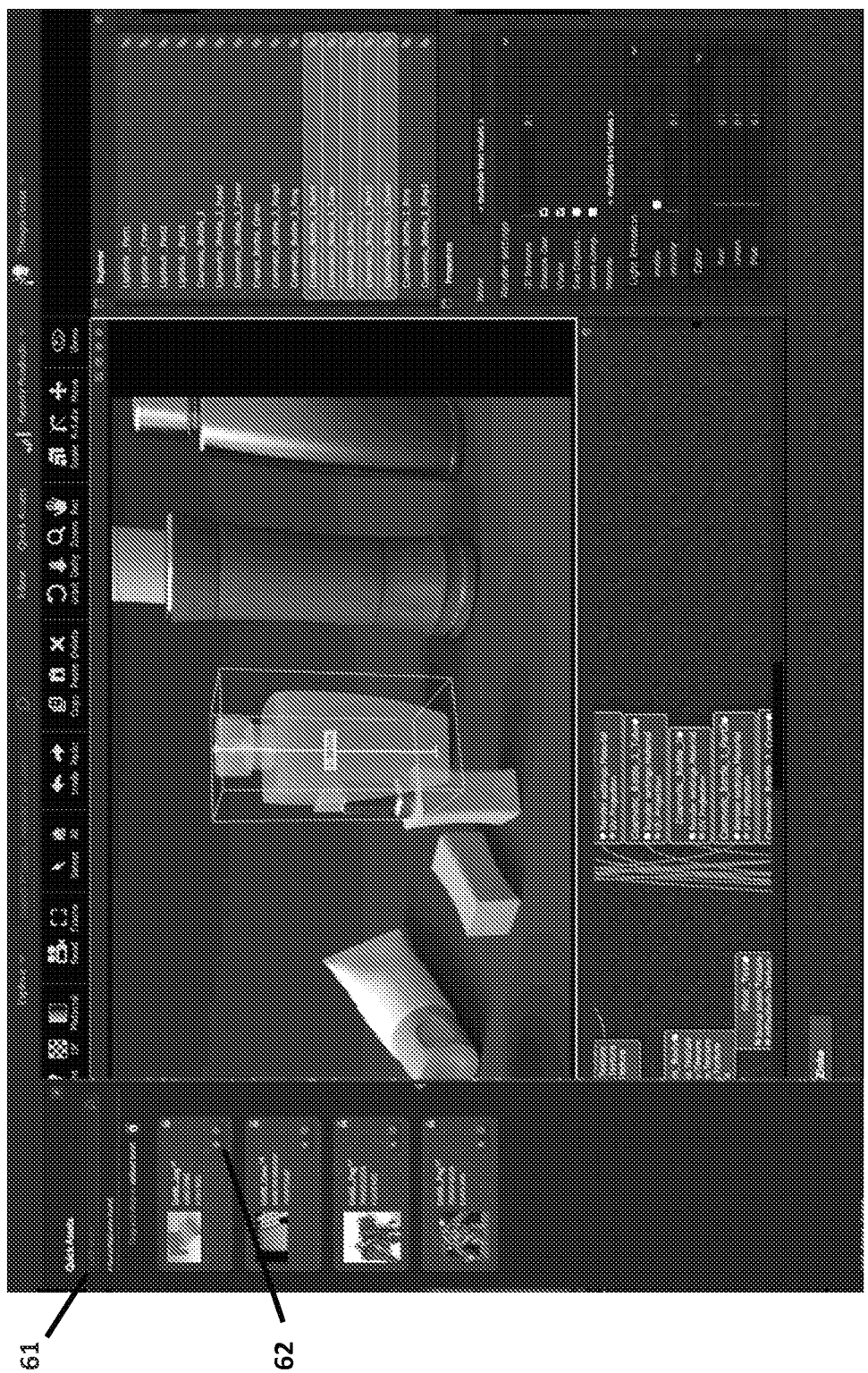
FIG. 6 is a screenshot of the end-user editing interface showing a Quick Assets panel, according to some embodiments.
Figure 7:
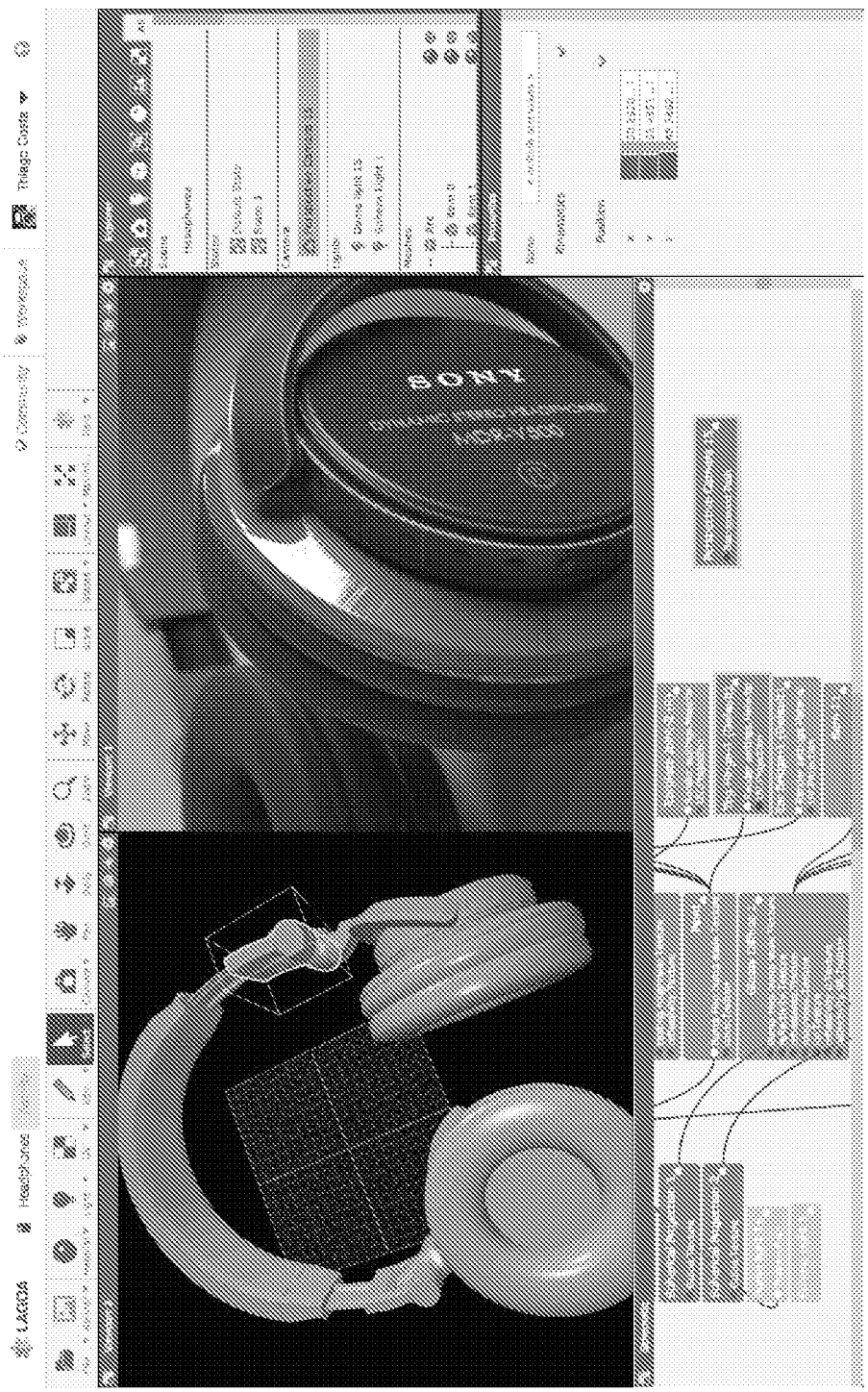
FIG. 7 is a screenshot of an end-user editing interface according to some embodiments, showing a side-by-side view of biased rendering unbiased rendering.
Figure 8:
FIG. 8 is a screenshot of an end-user editing interface according to some embodiments, showing an unbiased rendering of a portion of a 3-D project.
Figure 9:
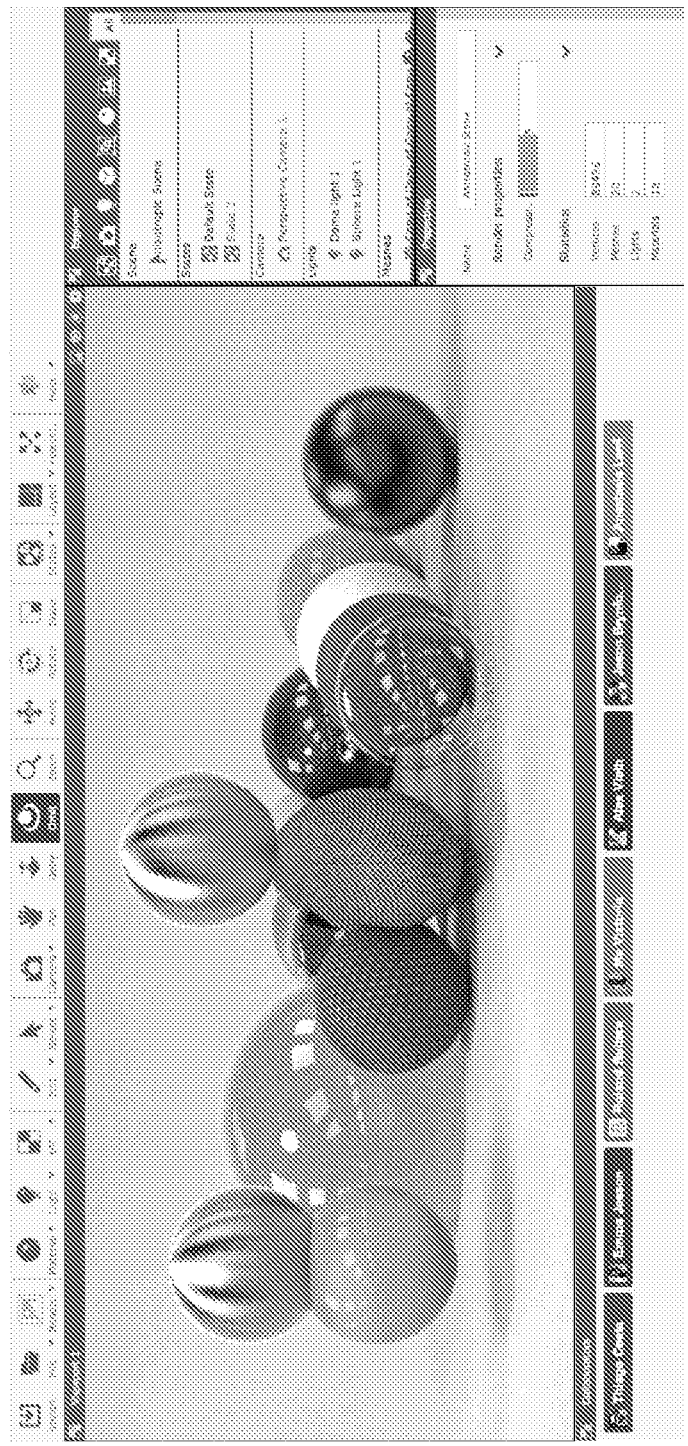
FIG. 9 is a screenshot of an end-user editing interface according to some embodiments, showing an unbiased rendering of a portion of a 3-D project along with a "Collaborators" pane.
Figure 10:
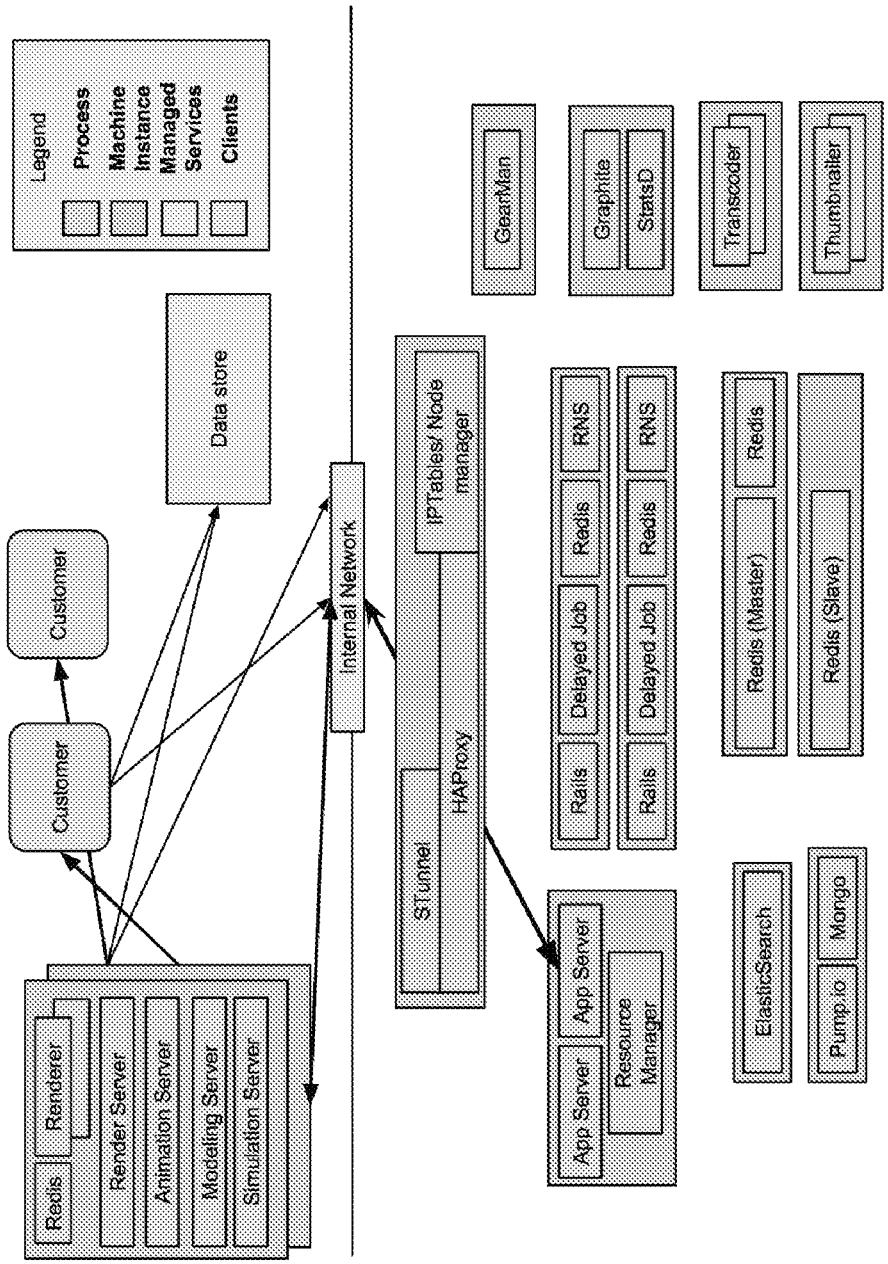
FIG. 10 is an architecture diagram showing the architecture of a distributed 3-D editing system according to some embodiments.

A user's list of favorite assets may be displayed in the Quick Assets panel 61, shown in FIG. 6, which allows users to quickly view and access their favorite assets. In some embodiments, the Quick Assets panel is a collapsible panel that the user may expand from within a project, or from within a project browsing screen. In other embodiments, the Quick Assets panel may be represented by various types of floating toolbox windows or menus that the user may show/hide as desired.

When an asset is added to the Quick Assets panel, a reference to that asset is added to the user's favorite assets list. Assets may be added to the user's favorite assets list by dragging them to the Quick Assets panel from elsewhere in the end-user client interface, or from the desktop of the local machine. Additionally, a user may add assets to the favorite assets list by toggling the Add Favorite user interface element 62 that is displayed with an asset. Once an asset has been added to the favorite assets list, toggling the Add Favorite element again will remove the asset from the list of favorites.

Synchronization and Networking

Client Synchronization

The systems described herein are designed to allow multiple users, each using a separate end-user device, to edit the same project simultaneously. During the editing process, each client maintains a up-to-date copy of the relevant project state (i.e., the project settings and data that are relevant to that client). Each client's copy of the project state contains only those project settings and data that are relevant to that particular client. For example, a tablet that lacks hardware rendering capabilities (such as OpenGL), might not load geometry information. Similarly, updates to the "Schematic View", which allows as inter-user editing of materials, and updates to the "Property View" used for scene editing, are not maintained by the rendering client. Yet these clients are allowed to load and have—in memory—all of the data associated to the scene, or even make modifications to the data regardless of the implementation of how each client modified the data.

In some embodiments, the scene is represented as readable text (e.g., ASCII data). This data includes a set of typed objects identified by Global Unique Identifiers (GUIDs), where each GUID is associated with a set of properties and parameters based on the type of the object identifies. Each GUID is unique and persistent, and may be used by all clients in the session to refer to a particular object. The GUID may be generated and associated with an object of a particular type by the first client to create the object. This client generates the GUID using, e.g., a combination of the current time and a pseudorandom number to guarantee uniqueness. A set of properties and parameters provided by, e.g., a PropertySet server (provided by the application server) is attached to the GUID based on the provided type.

For example, an object of type CAMERA might be created with a GUID ##### (where each # represents a digit from 0-9), and associated with various properties (e.g., LensFStop, CameraPosition, etc.) where each property is associated with one or more parameters (e.g., {LensFStop=n}, {CameraPosition=(x, y, z)}, etc.). Each client will receive the new CAMERA object's GUID and its associated properties and parameters (if the client has the ability to operate on objects of the CAMERA type), which it may used to construct the object locally.

For example, end-user clients (e.g. a tablet-based client such as an iPad) and rendering clients will construct the CAMERA object with the provided set of Properties and Parameters. The iPad client can initiate changes in this data; for example, it could modify the position of the camera based on the local positioning of the iPad in the world, or of the position of the user's finger on the screen of the iPad. A browser-based client could initiate changes as well: for example, a browser-based client might alter the quality of the camera lens by adjusting the parameter via a slider control displayed in the browser window.

When data is changed, a message is sent to all clients in the channel containing the GUID of the changed object, along with any parameters and properties of the object that have been changed. For example: a change message such as (#####, {LensFStop=3}) indicates that the parameter value of the LensFStop property for object with GUID ##### has been changed to 3. Each client consumes the data, and applies the changes according to its role in the system. Upon receiving such a message, a rendering client, for example, might start producing new rendered images based on the updated lens properties of the identified CAMERA object.

For performance reasons, when binary data (e.g., geometry information) is associated with an object, this data may be stored in a static storage server (attached to the application server), where it is associated with the object's GUID. Even if a client does not download this "blob" of binary data associated with the object, it may still modify other properties and parameters associated with that object. For example, the color of a given triangle of a mesh may be stored as a parameter of the "Material" property of an object of type MESH. This color may be changed by a client, even if that client has not downloaded the binary geometry information associated with the mesh object.

The storage client maintains a complete and persistent copy of the project state, in order to ensure that project data consistency throughout the editing session for clients which may connect and disconnect over time.

When project data is modified or added by a client, the client's updates are transmitted to the application server, the application server processes and distributes the updates to the other clients in the session, and each client adjusts its copy of the project state to reflect the changes.

For example, when an end-user client modifies the geometry of a scene by moving an object from one place to another, the modified geometry is transferred to the application server, which distributes it to the rendering client. When it receives the updates, the rendering client updates its copy of the project's state and begins to render the scene according to the new geometry.

If a second user is connected to the session at the same time, the updated geometry will also be sent to a second end-user client. The uploading and distribution of project modifications is synchronous, so the changes made by the first user will be reflected on the second user's screen in real-time (if the second user is using biased rendering).

Each end-user client has a local "undo stack" that tracks the user's recent changes. When an end-user presses the "Undo" button, the most recent change in the user's local undo stack is reversed.

System-controlled clients also produce data that is distributed and consumed by other clients in the session. For example, throughout the rendering process, a rendering client produces a stream of progressive, rendered image data. As it is produced, this data is sent to the Application Server and distributed to end user clients, which allows them to display progressive rendering results in real-time.

To reduce network latency and maintain real-time synchronization among clients, the system may use various methods to minimize the size of the data that is transferred between the clients and the application server. For example, as explained above, the application server does not always transfer a project update to all end-user clients; the updated project information is only transmitted to the clients that need it.

Network latency may also be reduced by transmitting only the modified portions of the project data and allowing each client to apply the changes to its existing copy of the project state. Alternatively, instead of transmitting the modified data, the modifications themselves may be described using an agreed-upon protocol. For example, if an end-user moves an object O from position X to position Y, the end-user client may simply transmit the message "MOVE (O, X, Y)" to the application server.

Geometry Compression

Further reduction in latency is achieved by compressing geometry data before transmitting it over the network. Geometry data refers to data that specifies the size, topology, location and orientation of geometric primitives that represent objects in a scene (e.g., a triangle is represented by 4 vectors: three specifying the position of its vertices and the fourth representing the unit vector normal to its surface). Geometry is represented by sets of typed data streams, including, e.g., values of type char, int32, int64, float, vector2, vector3, normalized vector3 and vector4.

Geometry data streams are compressed using a two-step process. First, the size and entropy of the data is reduced by applying techniques that are specific to particular data types and stream types. For example, normalized vectors may be re-parameterized using spherical coordinates, floating point values may be converted to their corresponding fixed point representations, vertices that are shared by two or more triangles may be transmitted only once, and 32- and 64-bit integers may be converted into 8- or 16- or 24-bit integers when possible. Also, to reduce entropy, streams containing index values can be compressed using difference encoding (e.g., {1, 2, 3, 4, 5, 6, 7, . . . } may be converted to {1, 1, 1, 1, 1, 1, . . . }). Further reduction in entropy can be achieved by rearranging the order in which vertices are transmitted.

The encoder may use a priori knowledge about the input data to determine whether one or more of these techniques is appropriate for a given data stream. Alternatively, the transcoder may apply particular encoding techniques based on "hints" embedded in the data stream itself.

After the data streams have been compressed using one or more of the geometry-specific techniques described above, a general-purpose compression method (e.g., zip) is applied to the resulting data.

Resource Allocation

The systems and methods described herein allow more than one collaborative editing session at a time, and indeed, can be scaled to accommodate hundreds or thousands of users simultaneously collaborating on 3-D projects in groups of various sizes. To meet the rendering needs of so many simultaneous editing session, the system includes a pool of rendering clients that are ready to be allocated among the various editing sessions as needed. However, the allocation and deallocation of rendering clients is transparent to the end-user. In a commercial system, when rendering resources are in high demand, priority may be given to premium customers.

For rendering-intensive applications, more than one rendering client may be allocated to a session. For example, when rendering a time-series of frames for a simulation or animation, different frames may be rendered simultaneously by different rendering clients, reducing the time to completion.

Asset Marketplace

The end-user client interface may provide access to a "marketplace" for 3-D assets. Using the marketplace, users may "demo" assets for a limited time by adding them to a project and evaluating how they look in the context of various project scenes. Users may also "rent" assets for longer time periods, or buy the right to use them indefinitely.

Progressive Asynchronous Refinement of Asset Information

In conventional 3-D editing applications, importing an asset into a project is typically a synchronous process in which an asset must be imported and processed before it can be used within a 3-D environment. This can lead to undesirable delay caused by import and processing delays (in a distributed system, additional delays may be caused by network latency).

To minimize this delay, some systems and methods described herein may utilize an asynchronous importation method, in which a proxy representation of an imported asset is immediately generated and served to all clients. The proxy representation allows users to utilize the asset immediately, before it is fully processed. As the asset is processed according to various stages of the asset preparation pipeline (which may include, e.g., Asset Transcoding/Resizing, Normal Generation, Thumbnail Generation, etc.) the resulting information is distributed to the clients and, and the proxy representation is incrementally replaced. For example, low-resolution components of the proxy object will be transparently replaced with higher-resolution representations, thumbnails will be received and displayed by client machines as they are generated, etc.

For example, resolving the 3-D mesh corresponding to a new asset may involve the following steps:

1. The end-user client application connects to two messaging channels, one generalized channel for infrastructure reporting, and one channel specifically filtered for the context to which the client application is connected.
2. When a user adds a file containing a 3-D asset using the end-user client interface, either by dragging and dropping the file from their local computer or using the "Add File" mechanism, the end-user client can create a local, low-resolution "proxy" representation of the asset. This representation is sent along the contextualized messaging channel and distributed to other clients in the session, so that other clients connected to the same context are aware of the new asset.
3. Simultaneously, the end-user client can also break the asset into chunks and begin posting the chunks asynchronously to the application server. When the first chunk is received, the application server examines the file extension and magic bytes of the data to determine the data type. Based on this examination, the server schedules the appropriate transcoding operation and data generation tasks, and copies the chunks to a repository accessible to a transcoding server. The transcoding job may be defined by additional parameters e.g. the source of the data, the type of the data, the intended destination, the relevant context, etc.
4. The transcoding server receives all of the chunks and transcodes the file to an internal format. The transcoded output is posted to the location specified by the "destination" parameter. The application server, which requested the transcoding operation, is notified that the operation has completed.
5. The application server will notify the clients over the contextualized channel that the asset has been updated, at which point each client will fetch the additional information provided by the transcoding server, and update its local representation with the new information.
6. This process performed (in some cases concurrently) for other types of information pertaining to the asset (e.g., thumbnails, etc.).

Rendering

As described above, the system allocates rendering clients to a project session as needed to render 3-D models and scenes. In some embodiments, the rendering clients use a modified version of the Monte Carlo Path Tracing (MCPT) algorithm. MCPT is a well known rendering algorithm that calculates the radiance at each pixel of the output image by integrating the radiance contributions of randomly sampled paths passing through that pixel. For a description of MCPT see generally Matt Phar, Greg Humphreys. *Physically-Based Rendering: From Theory to Implementation* ($2^{nd}$ Ed.). Morgan Kaufmann Publishers Inc., 2010.

Firefly Reduction

Rendering certain types of scenes using the MCPT algorithm can lead to "fireflies"—outlier samples that appear in the output image as bright pixels that would take substantial time to fully converge. To provide fast rendering feedback with acceptable image quality, some embodiments may employ the firefly reduction technique described below.

Fireflies are caused by improbable (or "singular") sample paths that have a low probability for being sampled but high throughput. This is a consequence of the fact that path sampling techniques are not effective for certain paths. The incidence of fireflies can be reduced by modifying the MCPT algorithm to include the step of estimating the degree of singularity corresponding to a particular path, and assigning that path a weight W, where W≤1. Generally, the higher the degree of singularity, the smaller the weight W.

A path's degree of singularity may be estimated based on scattering Probability Density Functions (PDFs) along the path, as well as the PDFs of light sources that contribute to the path. For example, a path starting at the virtual camera (i.e. an "eye tracing" path) with scattering PDFs $\{PDF_1, PDF_2, PDF_3, \ldots, PDF_i,\}$ representing i scattering events along the path, and light sampling probability function $PDF_{light}$ when approaching a light source, the weight W may be computed as follows:

1. Accumulate relative changes of the PDF along a path if $PDF_j < PDF_{j+1}$:

$$A = \prod_{j=1}^{i-1} \min\left(\frac{PDF_j}{PDF_{j+1}} \cdot 1\right)$$

2. Characterize the deviation of $PDF_{light}$ from the PDF of an isotropic light source $PDF_{isotropic}$ by computing the ratio between them:

$$B = \frac{PDF_{isotropic}}{PDF_{light}}$$

3. Compute the path weight W based on a user defined parameter α:

$$C = \frac{\max(A, B)}{\alpha}$$
$$W = \min(1, C^2)$$

Here, the parameter α controls the bias introduced by the method (where α=0 results in an unbiased image, and α=1 results in a maximally-biased image). Thus, the degree to which firefly samples are attenuated can be adjusted by changing the value of a single parameter, a.

A similar technique may be used for calculating the weight W' of a path starting at a light source (i.e., a "light tracing" path):

1. First, relative PDF changes are accumulated:

$$A' = \prod_{j=1}^{i-1} \min\left(\frac{PDF_{j+1}}{PDF_j} \cdot 1\right)$$

2. The PDF deviation is characterized as above:

$$B = \frac{PDF_{isotropic}}{PDF_{light}}$$

3. Finally, the weight W' is computed:

$$C' = \frac{\max(A', B)}{\alpha}$$
$$W' = \min(1, C'^2)$$

When used with bidirectional MCPT (without Metropolis-based sampling), the firefly reduction method may be combined with multiple importance sampling to reduce the impact of samples where neither eye nor light tracing is effective. The above firefly reduction technique can be optionally combined with a traditional image-based method, where remaining outliers are first detected in the high dynamic range rendering output and replaced by using a median operator after tone mapping.

Combining Biased and Unbiased Rendering

In rendering, algorithms are commonly classified into three different categories based on their statistical properties: unbiased, biased and consistent. Biased and consistent techniques can be very effective in turning high frequency noise occurring in MCPT (which is unbiased) into less obvious correlation artifacts and thus can generate decent looking images more quickly than purely unbiased methods. Existing rendering systems use biased, consistent or unbiased methods to render images. If the result is not satisfying, the user is forced to restart the rendering process, either to change the method or to use higher quality settings.

To address this problem, the rendering clients disclosed herein may compute unbiased and biased solutions at the same time. The rendering is progressive and can be paused and continued to improve quality without the need for restarting the main rendering process. The user can review the intermediate results of the different techniques within seconds. Computing both biased and unbiased solutions also makes it possible to mix both solutions in one image on a per-object basis.

This may be achieved by caching and averaging radiance information computed during unbiased MCPT at each vertex of a light path. At the same time the original MCPT samples are kept. Two user defined parameters, β and γ, are used to control spatial resolution and path lengths of radiance samples to be cached.

Multiple sparse spatial hash grids at different spatial resolutions are created to store and update average radiance values. Separate caches are used for volumetric scattering and surface scattering separate. For each of the hash grid volumetric pixel elements (or "voxels"), we keep track of an entropy-based measure E, the weighted sum Ω of the radiance samples, the total sample weight $W_\Omega$, and the total number of averaged samples N.

The minimum spatial resolution of a hash grid voxel is given by the user-defined parameter β, which determines the minimum spatial extent of a voxel. Based on this parameter, multiple hash grids $\{h_1, h_2, h_k\}$ are created, where hash grid $h_i$ has spatial resolution $2^i\beta$. The memory for hash grid voxels may be allocated lazily, as it is needed at runtime. This way, only relevant voxels will ever be created and stored in memory. Lazy memory allocation allows the user-defined parameter β to be changed dynamically during rendering.

The hash grids $\{h_1, h_2, \ldots, h_k\}$ are updated during rendering for each path sample, based on a user parameter γ. For a path P, containing n vertices $\{p_1, \ldots, p_n\}$ with respective radiance estimates $\{r_1, r_n\}$, the hash grids are updated for paths of length γ as follows:

1. Compute the voxels $\{v_1, \ldots, v_k\}$ (in $\{h_1, \ldots, h_k\}$) enclosing the sample $r_\gamma$.
2. For i=1 to i=k, update voxel $v_i=(W_\Omega, E, N)$ as follows:

$$\Omega \leftarrow \Omega + w_\gamma \cdot r_\gamma$$

$$W_\Omega \leftarrow W_\Omega + w_\gamma$$

$$E \leftarrow E + \left| \frac{\Omega + w_\gamma + r_\gamma}{W_\Omega + w_\gamma} - \frac{\Omega}{W_\Omega} \right|$$

$$N \leftarrow N + 1$$

where $w_\gamma$ is the weight received from trilinear grid interpolation based on the location of the sample.

These spatial data structures $\{h_1, \ldots, h_k\}$ are efficiently queried in a second pass to compute the final biased estimate. To this end, rays are traced from the camera again, but, in contrast to conventional eye tracing, multiple scattering and indirect illumination effects are approximated by reading radiance values from the cache instead of continuing paths. At each scattering event, if the current path length (from the eye) equals the user specified parameter γ, we first retrieve the voxels $\{v1, \ldots, v_k\}$ (in $\{h_1, \ldots, h_k\}$) enclosing the point of interaction (or "path vertex").

Then, starting with i=1, we retrieve the average variance of vertex $v_i$ and accept if $N<N_{min}$, and $E/N<E_{min}$ (using fixed parameters $N_{min}$ and $E_{min}$).

Non-Local Image Reconstruction

Image Reconstruction refers to the process of reconstructing the "true image" from noisy image data. Traditional approaches to image reconstruction involve applying a filter that removes noise from a pixel by replacing it with a weighted average of the pixel values in its neighborhood. These are termed local image reconstruction methods.

By contrast, the rendering clients disclosed herein may use non-local image reconstruction methods, in which noise is removed from a region of an image with reference to other, similar regions of the image.

This may be accomplished using two interleaving steps as follows:

1. First, in the tracing step, the image is rendered with batches of n samples per pixel (e.g., n=16), and the results are accumulated in a first frame buffer $FB_1$, as with conventional image reconstruction. In addition the n radiance samples are stored explicitly per pixel.
2. After the tracing step, a robust method for estimating non-local similarity in image space is employed. First, $k_1$ outlier samples (e.g., $k_1=2$) are removed by computing a singularity measure based on kernel density estimation. After removing these samples the remaining samples are used to reconstruct an image in a second frame buffer $FB_2$. The same process is repeated, removing $k_2$ samples (e.g., $k_2=4$) samples from the original sample distribution and accumulating the results in a third frame buffer $FB_3$.
3. Now a feature vector is computed for each pixel. This vector includes the pixel colors stored in $FB_2$ and $FB_3$ as well as the average colors from the 8 neighboring pixels in stored in $FB_2$ and $FB_3$. The components are stacked and stored in a k-d tree for efficient similarity search.
4. Finally, an image is reconstructed by employing k-nearest-neighbor search for each of the pixels, using the k-d tree described above. From the original sample and its k nearest neighbors, an average color is computed based on the color information stored in $FB_1$. This step may be repeated for each of the samples corresponding to the pixel to yield the final solution.

This process is repeated progressively refining the image, until stopped by the user. The filtering process is controlled by one user-defined variable: the size of the neighborhood k in the nearest-neighbor search. This parameter may optionally decrease automatically over the number of rendering iterations. Moreover, dimensionality reduction techniques such as PCA may be employed to reduce the dimensionality of the feature space and thus improve the computational costs of the above method. Using tile-based rendering, the memory consumption and computation time of the above method can be further reduced.

The non-local approaches to image reconstruction described above are more efficient than traditional, local methods, and in many cases yields better results.

Synthesized Bidirectional Texture Functions

Bidirectional texture functions (BTFs) are often used for generating photo-realistic rendering of surfaces. A BTF is a function that describes the appearance of a textured material at any position for any combination of light and viewing angles. For a general description of BTFs see Dana, K. J., et al. 1999. Reflectance and Texture of Real-World Surfaces. ACM Transactions on Graphics 18 (January), 1-34.

Traditionally, BTFs are acquired by photographing a material in a specialized device called an "acquisition chamber" under a wide variety of viewing angles and lighting configurations. This approach has several limitations: it requires expensive equipment, it is only capable of generating BTFs for materials that physically exist, and it is virtually impossible to edit BTFs that are created in this way once they have been created.

In some embodiments, the rendering systems and methods disclosed herein synthesize BTFs based on a priori knowledge of the microstructure of a material. Creating synthesized BTFs does not require a physical sample of the material or an acquisition chamber, which reduces the cost and allows the creation of BTFs that describe materials that do not physically exist. Also, synthesized BTFs can be edited much more easily than traditional BTFs.

To synthesize BTFs, a method may be used that takes advantage of the numerous Apparent Bidirectional Reflectance Distribution Functions (ARBDFs) that are contained in BTFs. A "neighborhood graph" is constructed, consisting of a k-nearest-neighbor graph that connects similar texture elements (or "texels"). This graph may be used to efficiently construct a synthesized BTF.

Synthesizing BTFs is an asynchronous process similar to asset importation (described above). While a BTF that represents a particular material is being synthesized by a rendering client, the end-user clients use a "proxy" texture representation for that material. When the synthesized BTF becomes available, this proxy representation is transparently replaced by the BTF itself.

Thumbnail Generation

When a user uploads a 3-D model, a thumbnail representing the model is generated by a rendering client and distributed to all end-user clients in the session, where it is displayed in the "Assets" list. The renderer determines the optimal viewing angle for the thumbnail in a three-step process: First, the bounding box of the model is calculated and the renderer determines which faces of the box have the largest surface area. Then, the renderer produces images of the model from a variety of angles, such that in each of the images, one of the largest faces of the bounding box is substantially facing the viewer. Finally, the renderer selects the most detailed of these images (i.e., the image that produced the largest number of rays and scattering events during the rendering process). This algorithm for determining thumbnail orientation is designed to select an orientation that will show a large portion of the object's surface area and that will highlight the most distinctive features of the object.

Acceleration Data Structure

Interactive editing requires efficient data structures for rendering (using, e.g., the MCPT algorithm), and in particular, for computing ray-primitive intersections (i.e., the points at which rays intersect geometric primitives such as triangles, spheres, cylindric segments, etc.). A suitable data structure should enable accelerated computation of ray-primitive intersections, but also should be efficient to build and update.

To achieve these goals, systems and methods described herein may employ a dual spatial hierarchy. First, for individual geometric objects (e.g., triangle meshes, particle and fiber clusters) bounding-volume hierarchies (BVHs) of degree four are constructed. Second, from sets of BVHs $\{BVH_1, \ldots, BVH_n\}$ representing complex objects, a top-level k-d tree is constructed.

To improve the quality of the top-level k-d tree, the tree construction algorithm considers splitting planes including not only the bounding planes of the bounding box of $BVH_i$ but all bounding planes of the bounding boxes included within $BVH_i$. The k-d tree quality is further improved by considering expected intersection costs for each of the BVHs using a surface area heuristic (SAH). These costs are estimated by traversing the BVH and averaging the total costs of root-to-leaf traversal and the intersection cost for a leaf (based on number of primitive and SAH costs).

When a scene is edited, only the BVHs that are changed are updated, and the top-level k-d tree is then rebuilt. Thus, it is only necessary to apply linear transformations (i.e., computationally expensive operations such as rotation, scaling, translation, etc.) to the BVHs that are actually changed.

Improving Numerical Stability in Rendering

For rendering, some or all computations involving real numbers may be performed using single floating-point precision. This improves rendering performance, but special care must to be taken if objects of very different scales are present in one scene (e.g., hair and a human body), particularly for ray-primitive intersection. A similar issue occurs if the origin of a ray is distant from small objects that need to be tested against this ray. To improve stability (e.g., to avoid virtual "self intersection" artifacts or missed intersections) two different general approaches are used: First, an object BVH (as described above with reference to Acceleration Data Structures) is created relative to an object's center of mass, and at render time a ray gets transformed relative to the BVH to account for the respective translation. Second, while rendering, we attempt to move a ray's origin close to the object primitives to be intersected. This is achieved by moving the ray origin along the ray, and using information from the BVH traversal (i.e., the intersection points with the bounding volumes). Using this method may significantly improve both stability and marginal computational overhead.

Simulation, Animation, and Modeling

In some embodiments, the system may include simulation clients that use a simulation engine to simulate physical phenomena. For example, a multiphysics simulator might be used to simulate the behavior of various materials and processes (e.g., high-friction granular materials, incompressible fluids, elastic structures, and plastic deformations, etc.). The simulation client may operate in conjunction with end-user clients and/or rendering clients to configure and render a wide range of physically-based effects. Geometry produced by the simulation client can be received and rendered by an end-user client (using biased rendering) almost instantaneously, allowing the user to configure materials at interactive frame rates. The simulation client may also be used with rendering clients to render each frame of a time-series simulation and assemble the rendered frames into a video asset.

In some embodiments, the system may include animation clients that compute the geometry corresponding to user-defined animations. Like the simulation client, the animation client can be used with an end-user client to view and configure animated sequences in real-time, and may also be used in conjunction with rendering client(s) to render sequences of animated frames and assemble the rendered frames into a video asset.

In some embodiments, the system may include modeling clients that may be used to create new 3-D models by geometry tessellation. Modeling clients may also be used in conjunction with an end-user client to edit existing 3-D models in real-time.

It will be appreciated that the scope of the present disclosure is not limited to the above-described embodiments. The methods and systems described herein may be implemented using a wide variety of interfaces, hardware configurations, and rendering algorithms. Embodiments of the disclosed subject matter may be implemented using a variety of computer languages, including high-level or object-oriented languages, and these programs may be stored in hark-disks, non-volatile RAM, or any other computer-readable medium. Embodiments of the disclosed subject matter can be implemented with memory devices in microcontrollers, general purpose microprocessors, digital signal processors (DSPs), reduced instruction-set computing (RISC), and complex instruction-set computing (CISC), among other electronic components. Moreover, the embodiments, or portions thereof, described above can also be implemented using integrated circuit blocks referred to as main memory, cache memory, or other types of memory that store electronic instructions to be executed by a microprocessor or store data that may be used in arithmetic operations.

The descriptions herein are applicable in any computing or processing environment. The embodiments, or portions thereof, may be implemented in hardware, software, or a combination of the two. For example, the embodiments, or portions thereof, may be implemented using circuitry, such as one or more of programmable logic (e.g., an ASIC), logic gates, a processor, and a memory. While several particular forms of the disclosed subject matter have been described, it will be apparent that various modifications are possible. It is not intended that the disclosed subject matter be limited to the particular embodiments described here. Other advantages and novel features of the disclosed subject matter may become apparent from the detailed description when considered in conjunction with the drawings.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

What is claimed is:

1. A method of allowing multiple users to collaboratively edit 3-D projects in real-time using multiple client devices distributed over a network, the method including:
    enabling communication between the multiple client devices, wherein the multiple client devices comprise one or more end-user client devices and one or more rendering client devices;
    modifying a 3-D project using a graphical user interface running on a first end-user client device of the one or more end-user client devices by creating or changing, in accordance with capabilities of the first end-user client device, 3-D assets belonging to the 3-D project, wherein objects are associated with the 3-D project, wherein the objects comprise a set of associated properties and parameters with associated numeric values including a unique and persistent identifier (GUID) for each object that is used across all of the multiple client devices to reference each respective object when distributing information representing modifications;
    wherein the 3-D project further comprises binary geometric data specifying geometric locations and orientations of geometric primitives that represent the objects, wherein the modifying creates a modification, wherein the modification comprises first information representing the modification to a set of properties and parameters associated with an object of the 3-D project;
    maintaining, on the first end-user client device, a first end-user client relevant project state that represents project settings and data that are relevant to the first end-user client device, the first end-user client relevant project state including the binary geometric data;
    distributing the first information representing the modification to one or more additional end-user client devices, of the multiple client devices, over the network, wherein the one or more additional end-user client devices each maintain a respective additional end-user client relevant project state comprising the set of associated properties and parameters with associated numeric values;
    displaying said 3-D project using a graphical user interface running on a first additional end-user client device of the one or more additional end-user client devices, wherein capabilities of the first additional end-user client device is different from the capabilities of the first end-user client device, wherein the first additional end-user client device consumes the modification;
    wherein the first additional end-user client device does not download the binary geometric data but applies the modification to the set of associated properties and parameters with associated numeric values it maintains;
    wherein the steps of modifying, distributing, and displaying occur in real-time, allowing the first end-user client device and the one or more additional end-user client devices to display a substantially synchronized view of the 3-D project;
    wherein more than one collaborative editing session at a time is enabled;
    wherein the first additional end-user client device receives renderings reflective of the modification from at least one rendering client of a pool of the one or more rendering client devices;
    wherein a number of the multiple client devices that are simultaneously collaborating is scalable based on a pool of the one or more rendering client devices that are allocated to one or more editing sessions.

2. The method of claim 1 further comprising:
    communicating the modification to one of the one or more rendering client devices, wherein each rendering client device of the pool of one or more rendering client devices communicates with an application server;
    generating, using the one rendering client device, rendered images representing 3-D scenes relating to the 3-D project;
    distributing said rendered images to the multiple end-user client devices; and
    displaying said rendered images on the multiple end-user client devices, wherein at least one of the multiple end-user client devices is not capable of generating the rendered images that the one rendering client device is capable of.

3. The method of claim 1 wherein:
    asynchronous communication between different client devices occurs via a channel associated with the 3-D project;
    the information representing the modification is distributed to client devices in the channel;
    each client device in the channel applies the modification according to its role; and
    application of the modification by each client device in the channel is asynchronously distributed to other client devices in the channel such that the application is available for consumption by the other client devices.

4. The method of claim 1 wherein:
    the binary geometric data is stored in a storage server where it is associated with the GUID for the object.

5. A system for allowing multiple users to collaboratively edit 3-D projects in real-time using multiple client devices distributed over a network, the system including:
    (a) the multiple client devices, the multiple client devices comprising one or more end-user client devices and one or more rendering client devices;

(b) a first end-user client device, of the one or more end-user client devices, the first end-user device comprising a processor, the first end-user client device operable to:
  (1) provide a graphical user interface that receives user inputs to modify a 3-D project by creating or changing, in accordance with capabilities of the first end-user client device, 3-D assets belonging to the 3-D project by creating a modification, wherein objects are associated with the 3-D project, wherein the objects comprise a set of associated properties and parameters with associated numeric values including a unique and persistent identifier (GUID) for each respective object that is used across all of the multiple client devices to reference each respective object when distributing information representing modifications; wherein the 3-D project further comprises binary geometric data specifying geometric locations and orientations of geometric primitives that represent the objects, wherein the modification comprises first information representing the modification to a set of properties and parameters associated with an object of the 3-D project; and
  (2) maintain a first end-user client relevant project state that represents project settings and data that are relevant to the first end-user client device, the first end-user client relevant project state including the binary geometric data;
(c) one or more additional end-user client devices, of the multiple client devices, each additional end-user client device operable to:
  (1) receive the first information representing the modification from the first end-user client device over the network;
  (2) maintain a respective additional client relevant project state comprising the set of associated properties and parameters with associated numeric values;
  (3) display the 3-D project using a graphical user interface running on each additional end-user client device; and wherein:
each additional end-user client device is operable to receive and display the modification to the 3-D project in real-time, allowing the first end-user client device and the one or more additional end-user client devices to display a substantially synchronized view of the 3-D project as it is modified;

capabilities of the one or more additional end-user client devices are different from the capabilities of the first end-user client device; and
the one or more additional end-user client devices consume the modification, and at least one of the one or more additional end-user client devices does not download the binary geometric data but applies the modification to the set of associated properties and parameters with associated numeric values it maintains and receives renderings reflective of the modification from at least one rendering client of a pool of the one or more rendering client devices;
more than one collaborative editing session at a time is enabled;
a number of the multiple client devices that are simultaneously collaborating is scalable based on a pool of rendering client devices, of the one or more rendering client devices, that are allocated to one or more editing sessions.

6. The system of claim 5, wherein:
the rendering client devices, in the pool of rendering client devices, are operable to receive the modification and to generate a rendered image representing a 3-D scene relating to the 3-D project, wherein the rendering client devices communicate with an application server;
wherein said one or more additional end-user client devices are operable to receive and display said rendered image, wherein the one or more additional end-user client devices are not capable of generating the rendered image that the rendering client devices are capable of.

7. The system of claim 5, wherein:
asynchronous communication between different client devices occurs via a channel associated with the 3-D project;
the information representing the modification is distributed to client devices in the channel;
each client device in the channel applies the modification according to its role; and
application of the modification by each client device in the channel is asynchronously distributed to other client devices in the channel such that the application is available for consumption by the other client devices.

8. The system of claim 3 wherein:
the binary geometric data is stored in a storage server where it is associated with the GUID for the object.

* * * * *